(12) United States Patent
Staszewski

(10) Patent No.: US 6,442,197 B1
(45) Date of Patent: Aug. 27, 2002

(54) PHASE-SHIFT CALCULATION METHOD, AND SYSTEM IMPLEMENTING IT, FOR A FINITE-IMPULSE-RESPONSE (FIR) FILTER

(75) Inventor: Robert B. Staszewski, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/258,594

(22) Filed: Feb. 26, 1999

(51) Int. Cl.[7] .............................. H03H 7/30; H03H 7/40; H03H 5/159
(52) U.S. Cl. ..................... 375/229; 375/232; 375/233; 375/231
(58) Field of Search .............................. 375/324, 231, 375/260, 326, 229, 278, 350, 232, 142; 342/450, 457

(56) References Cited

U.S. PATENT DOCUMENTS 5,804,741 A * 9/1998 Freeman ................ 73/861.356
5,935,177 A * 8/1999 Cox et al. ................... 701/9

* cited by examiner

*Primary Examiner*—Stephen Chin
*Assistant Examiner*—Heechul Kim
(74) *Attorney, Agent, or Firm*—W. Daniel Swayze, Jr.; W. James Brady; Frederick J. Telecky, Jr.

(57) ABSTRACT

A method and system for performing a timing recovery acquisition of a sinusoidal preamble with reduced loop latency by effectively bypassing the FIR filter out of the timing loop. The method is implemented by estimating the FIR filter's (201) phase shift through knowing its coefficients a priori while also determining the phase error at the FIR filter's input. Because of the non-symmetric settings of the coefficients the phase shift through the FIR may not be zero. It reduces the latency of a non-data tracking timing loop by eliminating latency due to the FIR filter (201) itself. The coefficients can be either programmed in memory (205) or adapted as part of an LMS application. The estimate avoids the use of multiply operations, using add operations and a single divider. The estimated partial phase errors are then summed in a "FIR bypass-mode" phase detector (204) yielding total phase shift.

22 Claims, 4 Drawing Sheets

PHASE-SHIFT CALCULATION METHOD, AND SYSTEM IMPLEMENTING IT, FOR A FINITE-IMPULSE-RESPONSE (FIR) FILTER

FIELD OF THE INVENTION

The present invention relates to a method for estimating the total phase error at a finite-impulse-response (FIR) filter's output by observing the input data, assuming the coefficients of the FIR filter are ascertained a priori. The coefficients may be ascertained either by programming them in memory or by adapting them via a least mean squares method (LMS).

BACKGROUND

A FIR filter may be included in the general class of devices referred to as digital signal processors (DSP). This does not mean that the FIR can operate only on digital signals, however.

A "digital signal" is a signal that conveys a discrete number of values at discrete times. Contrast the "analog signal," i.e., a signal that conveys an infinite number of values whether continuous time or discrete time. A signal having a digital form may be generated from an analog signal through sampling and quantizing the analog signal. Sampling an analog signal refers to "chopping" the signal into discrete time periods and capturing an amplitude value from the signal in selected ones of those periods. The captured value becomes the value of the digital signal during that sample period. Such a captured value is referred to as a sample.

Quantizing refers to approximating a sample with a value that may be represented on a like digital signal. For example, a sample may lie between two values characterized upon the digital signal. The value nearest (in absolute value) to the sample may be used to represent the sample.

Alternatively, the sample may be represented by the lower of the two values between which the sample lies. After quantization, a sample from an analog signal may be conveyed as a digital signal. This is the resultant signal upon which the FIR filter may operate.

A DSP transforms an input digital signal to an output digital signal. For the digital FIR filter, the transformation involves filtering out undesired portions of the received digital signal. An original analog signal may be represented as a sum of a plurality of sinusoids. Each sinusoid oscillates at a particular and unique frequency. Filtering is used to remove certain frequencies from an input signal while leaving other frequencies intact.

A FIR filter is a device in which an input sample produces a finite number of output samples. After the finite number of samples expires, the FIR filter output is no longer affected by that particular input sample. Transversal filters, of which FIR filters may be a class, are filters in which a certain number of past samples are used along with the current sample to create each output sample.

Programs executing on FIR filters often do so in "real-time." Real-time programs are programs that must execute within a certain time interval. Regardless of whether a program executes in a large period of time or a small period of time, the result of executing the program is the same. However, if real-time programs attempt to execute in an amount of time longer than the required time interval, then they no longer will compute the desired result.

Programs executing on a FIR filter are real-time programs in that the instructions are manipulating a sample of a digital signal during the interval preceding the receipt of the next sample. If the program cannot complete manipulating a sample before the next sample is provided, then the program will eventually begin to "lose" samples. A lost sample does not get processed, and therefore the output signal of the FIR filter no longer contains all of the information from the input signal provided to the FIR filter. This potential for losing samples is reduced by a preferred embodiment of the present invention, while maintaining a required throughput rate.

A FIR filter may be programmed to modify signals. The number of instructions required to do this is relatively fixed. A FIR filter must be capable of executing this relatively fixed number of instructions on any given sample before the next sample of the series is provided.

A typical example of a high-speed FIR with five or more coefficients is a Type II FIR. A Type II FIR is based on an array of costly Multiply and Add (MAC) accumulation stages. A conventional system using MAC is constrained to a minimum number of gates to achieve a given partial product accuracy. Digital implementation of an FIR filter is also limited by the maximum number of logic gates that can be inserted between reclocking stages established by the filter's clock cycle. Thus, for a given digital process, a minimum time to process is established by the propagation time through the critical path. To achieve very high speeds of processing, the critical path is broken into a number of shorter paths that can be addressed at higher clock speeds, i.e., processed within a short clock cycle.

Some conventional high-speed systems employing FIR filters use an analog FIR filter placed before an analog-to-digital converter (ADC). This prevents the FIR filter's latency from accumulating in the sampled timing recovery loop. This method is inherently not well suited to digitally intensive designs.

Some existing designs always include the FIR filter in the timing recovery loop, increasing latency ab initio, and decreasing stability of the embedded loops, both the timing recovery and gain loops, for example.

The time it takes a timing recovery loop to synchronize to a reference impacts both speed of acquisition and "geography" that must be devoted to this function, e.g., disk space on the disk drive of a recorder. Conventionally, when READ mode is entered on the disk drive, a PLL acquires the initial clock frequency (i.e., natural data frequency) of the incoming signal from a sinusoidal preamble. A key parameter to optimize is the timing recovery $\Delta t$, or time to recover, associated with acquiring phase and timing from this preamble. The amount of disk space assigned to this activity needs to be minimized.

Other designs bypass the FIR filter during acquisition mode but require the coefficients of the FIR filter to be symmetric in order to avoid a phase hit when switching back the FIR filter at the end of the acquisition mode.

The dynamic power dissipated in conventional filter circuit implementations (assuming the use of CMOS ICs) is given by the relationship:

$$P \, C \times V^2 \times f \times N_{Gate} \qquad (1)$$

where:

C = the average loading capacitance of a gate in the IC chip,
V = the power supply voltage level,
f = the operating frequency, and
$N_{gate}$ = the number of gates that are switching at frequency, f.

Improved performance is generally realized with a higher operating frequency, $f$, but comes at the expense of higher power dissipation levels. From Eqn. (2), power consumption also increases in proportion to the number of gates. A common IC embodiment of FIR filters is a tapped delay line, in which each of the coefficients characterizing the filter corresponds to a separate "tap" along a delay line. The number of gates goes up in proportion to the number of taps. The number of taps dictates the overall time delay for data (in Type I FIR structure) to pass through the filter and thus limits the operating frequency (data rate). To compensate for this delay, data pipelining is introduced to increase the FIR filter's operating frequency and the effective system throughput. However, pipelining calls for more gates, resulting in even greater power consumption.

In magneto-resistive (MR) heads using FIR filters, with the MR head's inherent response nonlinearities, this constraint is becoming even more unacceptable. There are more modern methods that achieve a fully digital solution, but these are extremely complex while covering a disproportionately large area on a silicon chip. In one design, discrete time analog values are entered in memory as are weights, some of which are set to zero to improve throughput. In this architecture neither pass through delay lines.

In a magnetic disk data storage system, for example, information is recorded by inducing a pattern of magnetic variations on the disk, thus encoding the information. The magnetic variations are recorded along concentric circular tracks on the disk. The linear density with which the magnetic flux changes may be recorded along a track as well as the radial density of tracks on the disk is ever increasing.

As the recording density is increased, however, the magnetic readback signal from the disk becomes more and more difficult to read and interpret due in part to inter-symbol interference (ISI). ISI results from process-time overlaps and the reduced spacing between neighboring magnetic flux patterns along an individual track as well as between those on adjacent tracks. For drives with interchangeable disks, in particular, each disk may introduce its own irregularities into the readback signal due to naturally occurring variations within manufacturing tolerances. Moreover, the irregularities are not uniform even over an individual disk, but depend to some degree on radial position.

Increased data density has prompted the use of digital signal processing techniques to extract data from noisy, distorted or otherwise irregular readback signals. In one commonly used technique, a sequence of consecutive raw data samples read from the disk is passed through a filter that continuously monitors the expected error in the signal and corrects data accordingly. A popular class for this purpose comprises the adaptive FIR filters.

These filters provide time-varying signal processing that adapts signal characteristics, in real time, to a sensed error measure. The characteristics are defined by time-varying coefficients, the values of which are adjusted at regular intervals, again in real time, in order to minimize cumulative error.

An adaptive FIR filter may be thought of as having two parts: a filter structure that uses coefficients to modify data, and an adaptation circuit that updates the values of the coefficients. Existing implementations of filter structures and adaptation circuits are subject to design compromises.

SUMMARY

The present invention estimates the phase error at the output of a FIR filter by taking advantage of observations of input data, given that the FIR filter's coefficients are ascertained a priori. The present invention reduces the latency of the acquisition-mode timing loop by eliminating latency due to the FIR filter itself. Required silicon area on the chip is also kept to less than that of existing methods.

By observing the FIR filter's input signal, knowing the filter's coefficients, and calculating values of the phase shift of the sinusoidal preamble to the FIR filter and the sampled input signal, phase errors at the FIR filter's output are estimated. All such estimated phase errors are then input to a FIR filter "FIR-bypass-mode" phase detector and summed to provide the total estimated phase shift.

Some of the salient advantages of the present invention are that it:

reduces the latency of the acquisition-mode timing loop by eliminating latency due to the FIR filter itself.

increases loop stability as a result of reducing latency.

accurately estimates total phase shift of a FIR filter.

removes multiplication steps.

reduces propagation of noise by eliminating process steps.

performs calculations using quick and inexpensive add operations and a single divider.

separates, for efficient processing, phase detection operations during non-data tracking mode.

DETAILED DESCRIPTION OF PREFERRED EMBODIMENTS

The class of FIR filters with k coefficients fulfills the relationship:

$$Y(n) = \sum_{j=0}^{k-1} C(j) \times X(n-j) \qquad (2)$$

Figure 1:
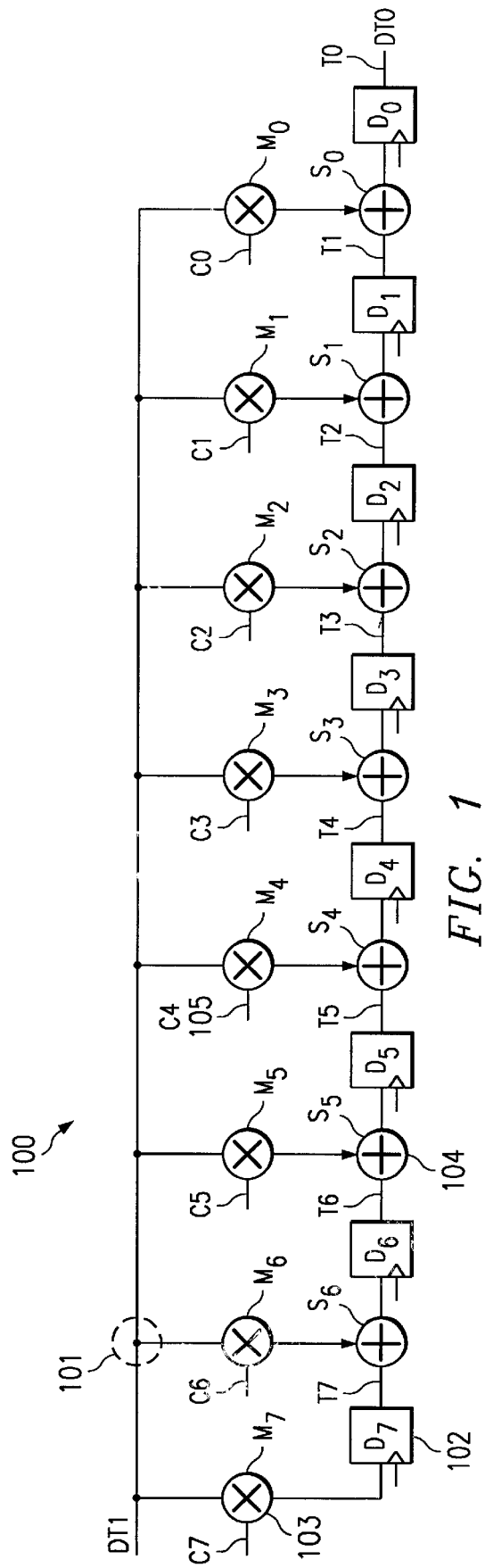
FIG. 1 is a block diagram of an 8-tap exemplary FIR filter.

Where:

$C(j)$=coefficient of the filter with $X(n)$ as an input sample and $Y(n)$ as an output sample $Y(n)$=sum of the products over the interval, j=0 ... k−1 j=the index $X(n)$=the most recent value of the input sample $X(n-j)$=the delayed sample value associated with delay, j Referring to FIG. 1, a preferred embodiment of the FIR filter 100 includes eight nodes 101 with Multiply-and-Accumulate operations carried out at each tap. The filter 100 also has eight cascaded delay elements $D_0$ through $D_7$ 102. The eight nodes 101 and the delay elements $D_0$ through $D_7$ 102 are connected to eight multipliers $M_0$ through $M_7$ 103. The outputs of the multipliers 103 are connected to summers $S_0$ through $S_6$ 104 and accumulated through the eight delay elements 102. The coefficients, $c_0$ through $C_7$, 105 for the multipliers $M_0$ through $M_7$ 103 are provided by a coefficient memory (not shown in FIG. 1).

A design for a preferred embodiment of the present invention was developed using the following mathematical derivations.

Starting from the FIR filter transfer function, for an odd-tap FIR filter:

$$H(e^{j\vartheta}) = \sum_{k=0}^{N-1} h(k)e^{-jk\vartheta} \tag{3}$$

$$= \sum_{k=-M}^{M} h(k+M)e^{-j(k+m)\vartheta}$$

$$= e^{-jM\vartheta} \sum_{k=-M}^{M} h(k+m)e^{-jk\vartheta}$$

where:

$h(k+M)=h(k)-\Delta k$ $h(-k+M)=h(k)+\Delta k$

N=number of taps of the FIR filter

M=N/2−1 and $$H(e^{j\vartheta}) = e^{-jM\vartheta}\left[h(M) + \sum_{k=1}^{M}[(h(k)+\Delta(k))e^{-jk\vartheta} + (h(k)-\Delta(k))e^{jk\vartheta}]\right] \tag{4a}$$

$$= (\ldots)[h(k)(e^{jk\vartheta} + e^{-jk\vartheta}) - \Delta k(e^{jk\vartheta} - e^{-jk\vartheta})] \tag{4b}$$

$$= e^{-jM\vartheta}\left[(h(M) + 2\sum (h(k)\cos k\vartheta - j\Delta(k)\sin k\vartheta)\right]$$

$$= e^{-jM\vartheta}\left[(h(M) + 2\sum_{k=1}^{M}\left(h(k)\cos k\vartheta - 2j\sum_{k=1}^{M}\Delta(k)\sin k\vartheta\right)\right] \tag{4c}$$

for $\Theta=\pi/2$, the sampling frequency associated with EPR4, substituting $\pi/2$ fore $\Theta$:

$$H\left(e^{j\frac{\pi}{2}}\right) = e^{-jM\frac{\pi}{2}}\left[h(M) + 2\sum_{k=2}^{M}h(k)(-1)^{\frac{k}{2}} - 2j\sum_{k=1}^{M}\Delta(k)(-1)^{\frac{k-1}{2}}\right]$$

thus:

$$\vartheta = \tan^{-1}\frac{-2\sum_{k=1(odd)}^{M}\Delta(k)(-1)^{\frac{k-1}{2}}}{h(M) + 2\sum_{k=2(even)}^{M}h(k)(-1)^{\frac{k}{2}}} \tag{5}$$

For FIR filters having an even number of taps:

$$H(e^{j\vartheta}) = \sum_{k=0}^{N-1} h(k)e^{-jk\vartheta} \tag{6a}$$

$$= \sum_{k=0}^{M} h(k)e^{-jk\vartheta} + \sum_{k=M+1}^{N-1} h(k)e^{-jk\vartheta}$$

$$= \sum_{k=0}^{M} h(M-k)e^{-j(M-k)\vartheta} +$$

$$\sum_{k=0}^{M} h(M+1+k)e^{-j(M+1+k)\vartheta}$$

$$= \sum_{k=0}^{M}\left\{h(M-k)e^{-j(M-\frac{1}{2}+\frac{1}{2}-k)\vartheta} + h(M+k)e^{-j(M+\frac{1}{2}+\frac{1}{2}+k)\vartheta}\right\} \tag{6b}$$

$$= e^{-j(M+\frac{1}{2})\vartheta}\sum_{k=0}^{M}\left\{h(M-k)e^{-j(-\frac{1}{2}-k)\vartheta} + h(M+1+k)e^{-j(\frac{1}{2}+k)\vartheta}\right\} \tag{6c}$$

$$= e^{-j(M+\frac{1}{2})\vartheta}\sum_{k=0}^{M}\left\{[\bar{h}(M-k) + \Delta(M-k)]e^{-j(\frac{1}{2}-k)\vartheta} + [\bar{h}(M-k) - \Delta(M-k)]e^{-j(\frac{1}{2}+k)\vartheta}\right\} \tag{6d}$$

$$= 2e^{-j(M+\frac{1}{2})\vartheta}\sum_{k=0}^{M}\left\{\left[\bar{h}(M-k)\cos\left(\frac{1}{2}+k\right)\vartheta - j\Delta(M-k)\sin\left(\frac{1}{2}+k\right)\vartheta\right]\right\} \tag{6e}$$

$$= 2e^{-j(M+\frac{1}{2})\vartheta}\hat{H}(e^{j\vartheta}) \tag{6f}$$

where:

$$\bar{h}(M-k) = \frac{h(M-k) + H(M+1+k)}{2}$$

$$\Delta(M-k) = \frac{h(M-k) - h(M+1+k)}{2}$$

thus, $$\vartheta = \tan^{-1}\frac{-\sum_{k=0}^{M}\Delta(M-k)\sin\left(\frac{1}{2}+k\right)\vartheta}{\sum_{k=0}^{M}\bar{h}(M-k)\cos\left(\frac{1}{2}+k\right)\vartheta} \tag{7a}$$

and $$\vartheta = \tan^{-1}\frac{\sum_{k=0}^{M}[h(M-k) - h(M+1+k)]\sin\left(\frac{1}{2}+k\right)\vartheta}{\sum_{k=0}^{M}[h(M-k) + h(M+1+k)]\cos\left(\frac{1}{2}+k\right)\vartheta} \tag{7b}$$

in the preamble acquisition mode for a preferred embodiment of the present invention, for $\Theta=\pi/2$:

$$\vartheta = \tan^{-1}\left[\frac{\Delta(k)}{h(k)}\tan\left(\frac{1}{2}+k\right)\vartheta\right] \tag{8}$$

$$= \tan\left(\frac{1}{2}+k\right)\frac{\pi}{2} = \tan\left(\frac{\pi}{4} + \frac{k\pi}{2}\right)$$

$$= 1, -1, 1, -1, \ldots$$

An example of an 8-tap (i.e., an even FIR where N=8) is given below.

$$\hat{\vartheta} = -\tan^{-1}\frac{[h(3)-h(4)] + [h(2)-h(5)] - [h(1)-h(6)] - [h(0)-h(7)]}{[h(3)+h(4)] - [h(2)+h(5)] - [h(1)+h(6)] + [h(0)+h(7)]}$$

-continued $$\hat{\partial} = \tan^{-1} \frac{-h(0) - h(1) + h(2) + h(3) - h(4) - h(5) + h(6) + h(7)}{h(0) - h(1) - h(2) + h(3) + h(4) - h(5) - h(6) + h(7)}$$

$$\hat{\partial} = \tan^{-1} \frac{h_0 + h_1 - h_2 - h_3 + h_4 + h_5 - h_6 - h}{h_0 - h_1 - h_2 + h_3 + h_4 - h_5 - h_6 + h}$$

$$h_{even} = h_0 - h_2 + h_4 - h_6 \qquad (9a)$$

$$h_{odd} = h_1 - h_3 + h_5 - h_7 \qquad (9b)$$

$$\hat{\partial} = \tan^{-1} \frac{h_{ev} + h_{od}}{h_{ev} - h_{od}} \qquad (10)$$

Noting that for an asymmetry ratio of <40%:

$$\arctan(x) \approx x$$

and that at $\pi/4$, the maximum error will be 0.12, for a preferred embodiment of the present invention this is adequate, so that.

$$\hat{\partial} = \frac{h_{ev} + h_{od}}{h_{ev} - h_{od}} \qquad (11)$$

and the shift is:

$$shift = -\frac{\hat{\partial}}{\frac{\pi}{2}} \text{ (in bit clocks)} \qquad (12)$$

for 64 bits:

$$shift_{64} = -\frac{\hat{\partial}}{\frac{\pi}{2}} \times 64 = -\hat{\partial} \times \frac{128}{\pi} \qquad (13)$$

Note that the answer will be positive if the FIR leads, thus simply adding inside the phase detector.

Since for a 64-bit clock, $$\pm \frac{1}{2}T \equiv \pm 32 \equiv \frac{\pi}{2} \qquad (14)$$

Further, substituting for $\hat{\Theta}$ in Eqn. (13):

$$\hat{\partial}_{64} = \frac{(c4 - c3) + (c5 - c2) - (c6 - c1) - (c7 - c0)}{(c4 + c3) - (c5 + c2) - (c6 + c1) + (c7 + c0)} \times \frac{128}{\pi} \qquad (15)$$

Next calculating $\Theta_{DEN}$ and $\Theta_{NUM}$, $$\partial_{DEN}(\max) = (63 + 63) - (-63 - 63) - (-31 - 31) + (31 - 31)$$
$$= 376 < (2^9 = 512)$$

thus, $\partial_{DEN}(\max) = 9$ $$\partial_{NUM}(\max) = (63 - 0) + (0 - (-63)) - (-31 - 31) - (-31 - 31)$$
$$= 250 < (2^8 = 256)$$

$$\partial_{NUM}(\min) = (0 - 63) + (-63 - 0) - (31 - (-31)) - (31 - (-31))$$
$$= -250 < (2^8 = 256)$$

therefore, $\Theta_{NUM}$ is 9-bits signed.

Figure 2:
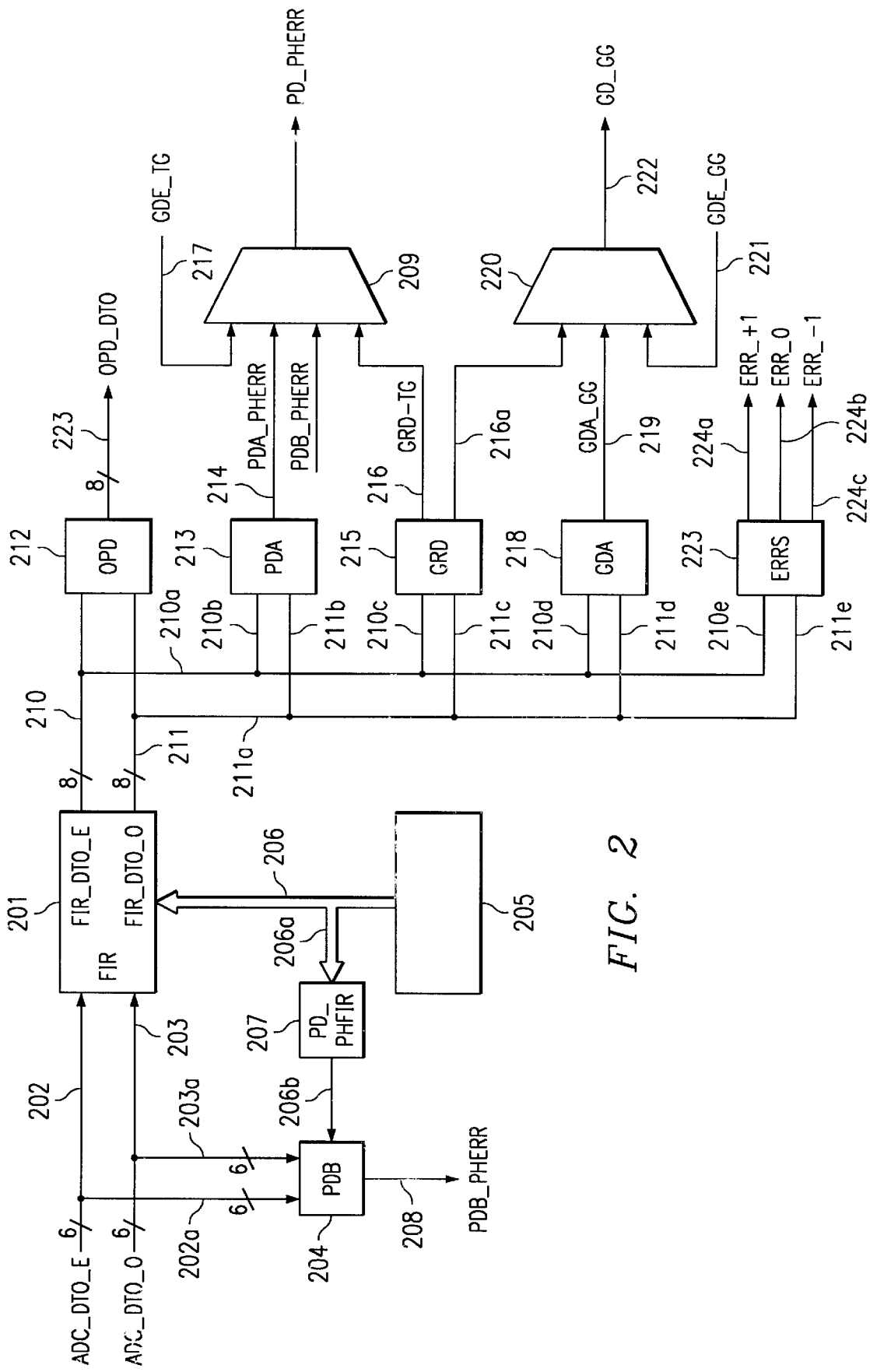
FIG. 2 is a block diagram of the necessary elements for controlling gain, phase, and frequency correction for a FIR filter of a preferred embodiment of the present invention.

FIG. 2 provides a view of the functions carried out by a preferred embodiment of the present invention. Signals, ADC_DTO_E and ADC_DTO_O are input to a FIR filter 201 over paths 202 and 203 from an ADC (not shown in FIG. 2) using a parallel architecture. The above signals are also provided over paths 202a and 203a, respectively, to a FIR-bypass phase detector PDB 204 during non-data-tracking operating modes of the FIR filter 201.

Still referring to FIG. 2, FIR-bypass phase detector 204 is also fed predetermined coefficients to be used at taps (not shown in FIG. 2) of the FIR filter 201. The coefficients are fed from a memory or adaptive circuit 205 to the FIR filter 201 over path 206 and concurrently to an element, FIR filter phase shift calculator, 207 over paths 206 and 206a. The output of element 207 is a signal PHASE_FIR fed to PDB 204 over path 224. Information contained in signal PHASE_FIR, normalized FIR phase shift, is processed in PDB 204, together with that from signals ADC_DTO_E and ADC_DTO_O, and output as signal PDB_PHERR (phase shift estimated at the FIR filter's 201 output as calculated in element 207 from a priori knowledge of FIR filter 201 coefficients and added phase error from paths 202a and 203a of input signals ADC_DTO_E and ADC_DTO_O to the FIR filter 201) over path 208 to multiplexer 209.

Again referring to FIG. 2, after input signals ADC_DTO_E and ADC_DTO_O are processed in FIR filter 201, they are output as signals FIR_DTO_E and FIR_DTO_O over paths 210 and 211, respectively, to 1+D operation/re-interleaver block OPD 212. The signals are processed in OPD 212 and output as signal OPD_DTO over path 223. Concurrently, signals FIR_DTO_E and FIR_DTO_O are transmitted over path 210a and 211a to other elements.

Still referring to FIG. 2, the first element to which signals FIR_DTO_E and FIR DTO_O are passed is acquisition-mode phase detector PDA 213, over paths 210, 210a, and 210b; and 211, 211a, and 211b, respectively. PDA 213, the preamble acquisition-mode phase detector, processes the inputs from paths 210b and 211b and outputs signal PDA_PHERR over path 214 to multiplexer 209. The output of multiplexer 209 is signal PD_PHERR (either PDA_PHERR or PDB_PHERR, depending on the current mode of operation), sent over path 224 for use in a timing recovery loop (not shown).

Figure 5:
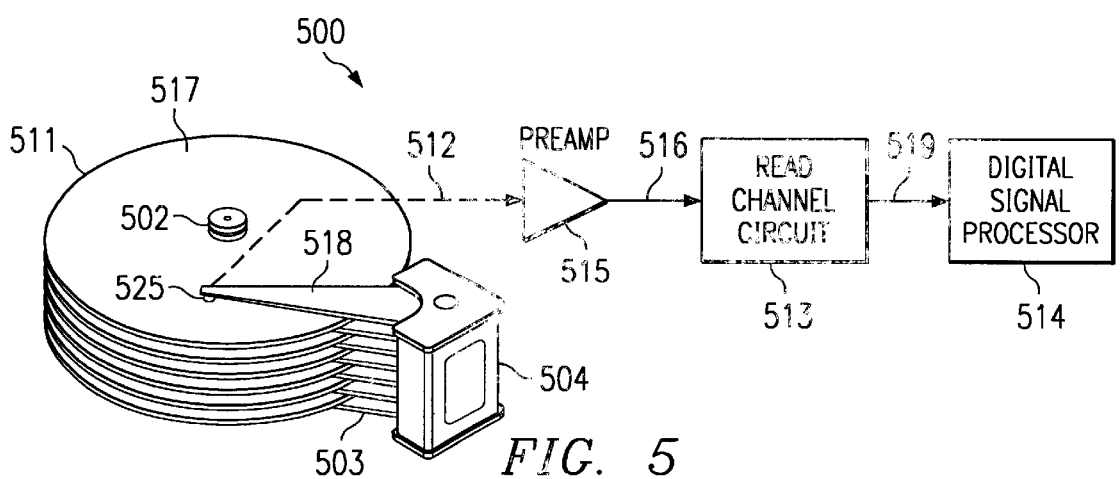
FIG. 5 is a block diagram of a disk drive and its read channel circuit, together with inputs and outputs therefrom.

Referring to FIG. 2, signal PD_PHERR is provided to a timing recovery circuit (not shown in FIG. 2) as an adjustment to bring the signals ADC_DTO_E and ADC_DTO_O into proper frequency and phase synchronization with the analog input signal to the ADC (not shown in FIG. 2). In a preferred embodiment of the present invention, the input signal is provided from the read head 505 of a disk drive 500 as shown in FIG. 5.

Further, the coefficients for the FIR filter 201 can be calculated using the least mean squares (LMS) method 205 so as to provide an adaptive feedback.

Figure 3:
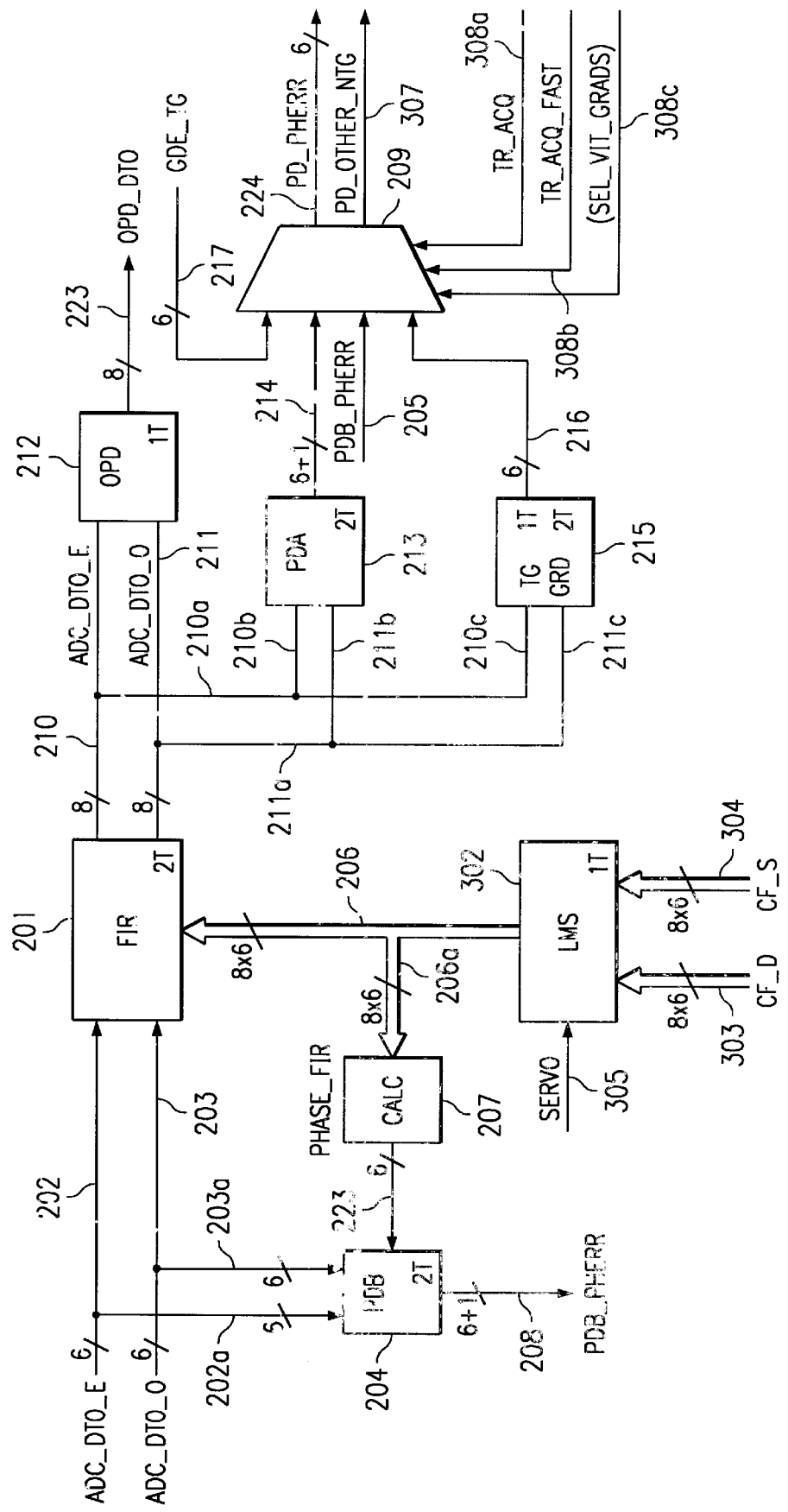
FIG. 3 is a detailed block diagram of the necessary elements for controlling phase and frequency correction for a FIR filter, including required number of bits per signal, of a preferred embodiment of the present invention.

FIG. 3 expands on FIG. 2, adding as detail the bit size of the signals generated as in FIG. 2, as well as additional timing recovery detail and a specific method for determining coefficients. Six-bit input signals ADC_DTO are provided to FIR filter 201 over paths 202 and 203, respectively and concurrently to FIR-bypass phase detector PDB 204 over paths 202a and 203a, respectively. The output of PDB 204 is a "signed" signal consisting of a 6-bit signal with an added most significant bit (MSB) serving as a 1-bit sign. This is fed to multiplexer 209 over path 208 where it is processed with two other signals as described below.

Signals CF_D, representing coefficients for "data mode" and CF_S representing coefficients for "servo mode" are arrays of coefficient buses provided to LMS circuitry 302 over paths 303 and 304, in this case 8×6 for an 8-tap FIR filter processing 6-bit coefficients. An additional signal from a servo (not shown in FIG. 3), is provided to LMS 302 over path 305 for the purpose of selecting servo mode or data mode operation. Processing of these signals in LMS 302 provides the proper updated coefficients for use by the FIR filter 201 as provided over path 206. The LMS circuitry 302 also inputs. to CALC 207over path 206a the same updated coefficients sent to FIR filter 201 over path 206. From CALC 207, signal PHASE_FIR, representing the phase of the input signal to the FIR filter 201, is sent to PDB 204. PDB 204 adds the phase error of input signals ADC_DTO_E and ADC_DTO_O to the estimated phase shift PHASE_FIR and outputs error signal PDB_PHERR to multiplexer 209, where it is processed as described for FIG. 2 above. However, in addition to outputting 6-bit signal PD_PHERR on path 224, multiplexer 209 also outputs over path 307 signal PD_OTHER_NTG, representing correction for the phase of the native timing gradient, as necessary, for use in those systems employing multiple PRML encoding modes, such as PR4 and EPR4.

FIG. 3 also further depicts input signals TR_ACQ, TR_ACQ_FAST, and SEL_VIT_GRADS, inputs from data acquisition and gradient selection operations to multiplexers 209 and 220 over paths 308a, 308b, and 308c, respectively.

Figure 4:
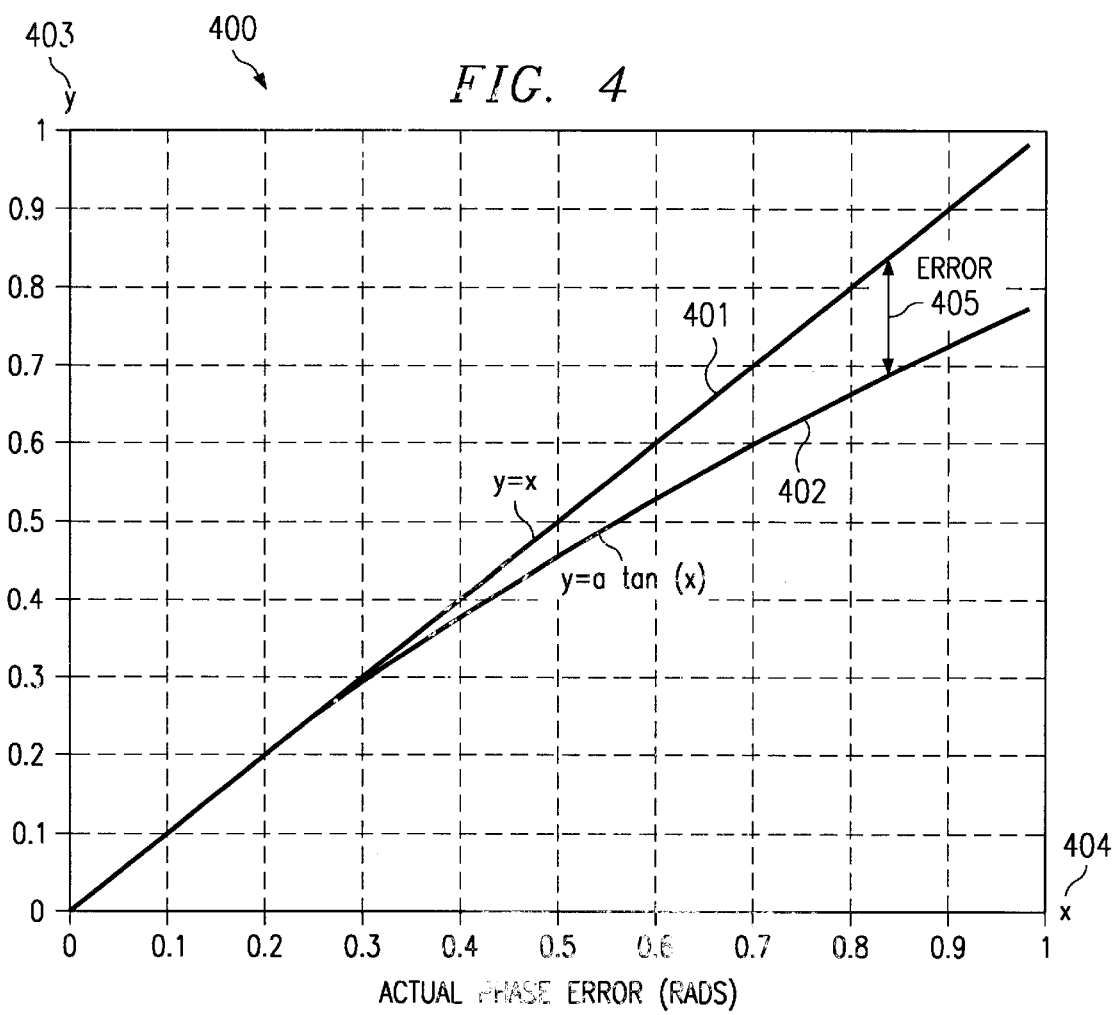
FIG. 4 is a comparison of actual vs. calculated phase error, in radians, for a preferred embodiment of the present invention as a result of using an arctan(x) approximation.

FIG. 4 shows the error 405 introduced by use of a preferred embodiment of the present invention when comparing actual phase shift, x 404, to output y, 403. As can be seen, the ideal line 401 showing actual phase shift is tracked very well at small angles. For example, for line 402, (calculated as y=arctan x), i.e., up to the error value of 0.5 radians there is minimal error. One of the assumptions made in deciding to use this method was that large angles would not be encountered in any intended applications.

FIG. 5 is a diagram of parts of a mass data storage device 500, including part of its read channel circuitry 513. The hard disk drive 501 contains several magnetic disks 511, each containing data on its magnetic surface 517 and each associated with an arm 503 controlled by a voice coil motor 504, the arms being connected to spindle 502 that is rotated by a spindle motor (not shown). At the outer end of each arm 503 is a read/write head 505 for reading from and writing to the disks 511. A magnetic disk output signal 512 from read/write head 505 is input to a preamp 515 that, in turn outputs amplified signal 516 to read channel circuit 513. The output signal is transmitted on path 519 from the read channel circuit 513 to a controller or digital signal processor 514. A preferred embodiment of the present invention is contained within the read channel circuitry 513.

The foregoing describes the salient features of the present invention's modified pipelined structure and modified architecture, and should not be interpreted as limiting the application of, method of operation, or uses for the present invention to that specified in the foregoing.

While the invention has been shown with specific components and circuits, and further described with regard to specific number system types, it will be understood by those skilled in the art that various other changes in the selection of components and use with different combinations of circuit components, or other details may be changed without departing from the spirit and scope of the invention.

I claim:

1. An architecture, using ascertained filter coefficients of an FIR filter, implementing synchronization circuitry used with filtering or equalization of a sampled input signal and a sinusoidal-like preamble, the architecture structured to estimate the phase at the FIR filters output, comprising:

a first circuit, having an input and an output, for calculating and outputting an estimate of the phase shift of the FIR filter, and a second circuit connected to said first circuit, having an input and an output, incorporating a phase detector and summing circuitry for determining the phase error of the input signal of said second circuit and summing said phase error with said estimated phase shift from said first circuit as said output of said second circuit, delivering a signal PDB_PHERR from said second circuit to a multiplexer for selection prior to transmission to a feedback circuit.

2. The architecture of claim 1 wherein the filter coefficients are used to calculate said phase shift.

3. The architecture of claim 1 wherein said sum is performed internally in a FIR-bypass-mode phase detector.

4. The architecture of claim 1 wherein the coefficients are ascertained during design and placed in a memory.

5. The architecture of claim 1 wherein the coefficients are ascertained during the filter's operation, being derived via a least mean squares (LMS) method.

6. A method for estimating the phase of a FIR filter that uses ascertained filter coefficients and implements synchronization circuitry the filter processing a sampled input signal and a sinusoidal-like preamble, comprising:

calculating and outputting an estimate of the phase shift of the FIR filter as a first output, and determining the phase error of the sampled input signal and summing said phase error with said first output as a second output, and delivering said second output to a multiplexer for selection prior to transmission to a feedback circuit.

7. The method of claim 6 wherein the coefficients are used to calculate said phase shift.

8. The method of claim 6 wherein said summing is performed internally in a FIR-bypass-mode phase detector.

9. The method of claim 6 wherein the coefficients are ascertained during design and placed in a memory.

10. The method of claim 6 wherein the coefficients are ascertained during the filter's operation, being derived via a least mean squares (LMS) method.

11. An FIR filter, using ascertained filter coefficients, implementing synchronization circuitry used with filtering or equalization of a sampled input signal and a sinusoidal-like preamble, the architecture structured to estimate the phase at the FIR filter's output comprising:

a first circuit, having an input and an output, for calculating and outputting an estimate of the phase shift of the FIR filter, and a second circuit connected to said first circuit, having an input and an output, a phase detector and summing circuitry for determining the phase error of the input signal of said second circuit and summing said phase error with said estimated phase shift from said first circuit as said output of said second circuit, delivering a signal PDB_PHERR from said second circuit to a multiplexer for selection prior to transmission to a feedback circuit.

12. The filter of claim 11 wherein the filter coefficients are used to calculate said phase shift.

13. The filter of claim 11 wherein said sum is performed internally in a FIR-bypass-mode phase detector.

14. The filter of claim 11 wherein the coefficients are ascertained during design and placed in a memory.

15. The filter of claim 11 wherein the coefficients are ascertained during the filters operation, being derived via a least mean squares (LMS) method.

16. A system employing a FIR filter, using ascertained filter coefficients, implementing synchronization circuitry used with filtering or equalization of a sampled input signal and a sinusoidal-like preamble, the architecture structured to estimate the phase at the FIR filters output comprising:

a first circuit, having an input and an output, for calculating and outputting an estimate of the phase shift of the FIR filter, and a second circuit connected to said first circuit, having an input and an output, incorporating a phase detector and summing circuitry for determining the phase error of the input signal of the second circuit and summing said phase error with said estimated phase shift from said first circuit as said output of said second circuit, delivering a signal PDB_PHERR of said second circuit to a multiplexer for selection prior to transmission to a feedback circuit.

17. The system of claim 16 wherein the filter coefficients are used to calculate said phase shift.

18. The system of claim 16 wherein said sum is performed internally in a FIR-bypass-mode phase detector.

19. The system of claim 16 wherein the coefficients are ascertained during design and placed in a memory.

20. The system of claim 16 wherein the coefficients are ascertained during the filters operation, being derived via a least mean squares (LMS) method.

21. The system of claim 16 wherein said system comprises a mass data storage device.

22. The system of claim 21 wherein said mass data storage device comprises a disk drive.

* * * * *